United States Patent
Schulz

(10) Patent No.: US 7,777,379 B2
(45) Date of Patent: Aug. 17, 2010

(54) SYSTEMS AND APPARATUS FOR REDUCING DAMAGES TO AN ELECTRIC MACHINE

(75) Inventor: Hermann Schulz, Kleinlangheim (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 0 days.

(21) Appl. No.: 11/398,114

(22) Filed: Apr. 5, 2006

(65) Prior Publication Data
US 2006/0251353 A1 Nov. 9, 2006

(30) Foreign Application Priority Data
Apr. 8, 2005 (EP) .................. 05007807

(51) Int. Cl.
*H02K 5/173* (2006.01)
*F16C 27/08* (2006.01)

(52) U.S. Cl. .................. 310/90; 384/220; 384/517; 384/536

(58) Field of Classification Search .......... 310/90, 310/51; 384/517, 192, 215, 220, 223, 248, 384/263, 420, 536
See application file for complete search history.

(56) References Cited

U.S. PATENT DOCUMENTS

| | | | |
|---|---|---|---|
| 3,786,289 A * | 1/1974 | Baclawski et al. ............ 310/90 |
| 5,997,183 A * | 12/1999 | Horng .......................... 384/517 |
| 7,153,031 B2 * | 12/2006 | Jones .......................... 384/517 |
| 2004/0130224 A1 * | 7/2004 | Mogi et al. ................. 310/75 R |
| 2006/0251353 A1 * | 11/2006 | Schulz ......................... 384/517 |

FOREIGN PATENT DOCUMENTS

| | | |
|---|---|---|
| CH | 315 972 A | 9/1956 |
| DE | 12 54 915 B | 11/1967 |
| FR | 1 086 999 | 2/1955 |
| GB | 412 491 A | 6/1934 |
| GB | 2058955 | * 4/1981 |
| JP | 08149741 | * 6/1996 |
| JP | 2002-339965 | * 11/2002 |

OTHER PUBLICATIONS

New Rivderside University Dictionary, copyright 1994, p. 136, Definition of "attach-ed".*
European Search Report for application No. EP 05007807.0, 7 pages, Aug. 29, 2005.

* cited by examiner

*Primary Examiner*—Karl I Tamai
(74) *Attorney, Agent, or Firm*—Westman, Champlin & Kelly, P.A.

(57) ABSTRACT

To prevent damage to an electric machine (1), for example in a motor vehicle, due to axial loading of the rotor bearing in a simple manner, a cushioning element (11, 18, 22, 27) is proposed to absorb axial loading of the bearing system (6, 7), thereby also reducing the axial play (8) of the bearing system (6, 7). When the bearing system (6, 7) is axially loaded, the cushioning element (11, 18, 22, 27) serves to convert kinetic energy into deformation energy.

4 Claims, 4 Drawing Sheets

SYSTEMS AND APPARATUS FOR REDUCING DAMAGES TO AN ELECTRIC MACHINE

PRIORITY

This application claims priority from European Patent Application No. EP05007807, which was filed on Apr. 8, 2005, and is incorporated herein by reference in its entirety.

TECHNICAL FIELD

The invention relates to an electric machine with a rotor and a stator and with a bearing for the rotor.

BACKGROUND

Electric machines with a rotor and a stator can be used both as generators for generating power and as drive motors. If such an electric machine is not handled properly, being subjected to an impact or fall onto its front face, the relatively heavy deadweight of the rotor can result in irreversible damage. It is thereby irrelevant whether the machine is put down abruptly or falls from a low height for example. If a bearing bracket or the shaft is affected, damage is inevitable, generally to the bearings. A further cause of damage is incorrect transportation, in particular in the case of machines transported with the shaft disposed in a vertical manner. Such transport damage occurs in particular due to holes in the road surface or as a result of rail joints. Finally fast axial acceleration can cause serious damage when the machine is in use. This is the case particularly when the electric machine is used as a drive in the automotive field.

The damage produced by the causes mentioned above is extremely difficult to identify. This means that in the case of transportation or handling damage in particular machines with damaged bearings can still be supplied for their intended use. This often then results in premature failure of the machines.

The problems mentioned above can be prevented for example by particular care when handling machines. This means that special work instructions have to be issued or further measures have to be implemented, for example employee training. It is known that suitable packing can be used to prevent transportation damage. The risk due to fast axial acceleration, in the automotive field in particular, can be compensated for to some degree by the mounting position of the electric machine.

SUMMARY

All known measures for preventing bearing damage share the fact that they are relatively complex and/or expensive. If there is still damage to the machine and it is already mounted, complex additional work is required, in particular bearing replacement or even replacement of the entire electric machine.

One object of the present invention is therefore to prevent damage to an electric machine due to axial loading in a simple manner.

This object can be achieved by an electric machine with a rotor, a stator, a bearing system for the rotor, and with a cushioning element to absorb axial loading on the bearing system, which also reduces the axial play of the bearing system.

One basic concept of the invention is to provide a cushioning element with a dual function to protect the bearing system of an electric machine, in particular in the case of a bearing system with one or more rolling bearings. This cushioning element serves on the one hand to absorb axial loading on the bearing system and on the other hand to reduce the axial play of the bearing system. This provides a particularly simple and economical solution to minimize the possible consequences of axial loading on the bearing system. Axial play is also equalized, increasing the smooth running of the shaft in the bearing system. This results in lower wear levels, thereby increasing the life of the bearings. At the same time bearing noise is reduced or even completely eliminated. Generally the life of the electric machine is significantly increased as a result.

When the rotor is subject to axial loading, the cushioning element helps reduce the loading on the bearing system by converting kinetic energy to deformation energy. In other words the cushioning element absorbs the energy of the impact, etc. by changing form and at the same time converting the energy supplied into heat. In other words the loading peaks acting on the bearing system are minimized by slow braking of the axial movement. The kinetic energy occurring as a result is converted to deformation energy and heat. After the impact, etc. the bearing system is returned to its initial position relatively slowly. This allows particularly reliable protection of the electric machine in a simple manner.

The axial play of the rotor, which is generally produced by the individual component tolerances or the end float, can be reduced to zero using the claimed cushioning element. It is then possible to prevent in particular axial vibration of the rotor in the magnetic field, to which the rotor tends in certain operating conditions.

The invention can be used with a large number of electric machines. However the use of the invention in electric motors in motor vehicles, for example in a radiator fan drive, is particularly advantageous.

According to advantageous embodiments it is particularly advantageous if the cushioning element is made of a plastic material, for example an elastomer or rubber. The use of plastics for the claimed cushioning element is particularly advantageous, as plastic components can be produced particularly economically and in any form. Also the large number of available plastics means that a suitable material can be found for any application, having optimum characteristics to absorb the forces occurring and in respect of ambient conditions, such as temperature, media (acids, water, etc), etc.

According to a particularly advantageous embodiment of the invention, the cushioning element is disposed on the floating bearing of the bearing system where it also serves to reduce axial bearing play. To this end the cushioning element is advantageously disposed between the stationary outer ring of a bearing (floating bearing) that is not fixed axially and an axial stop of the bearing seat of the floating bearing provided for this purpose. The cushioning element is therefore used in the manner of a so-called ball bearing end float washer known per se. These end float washers, which can for example also be used as corrugated washers, serve to reduce axial play in known bearings. They are however of necessity only suitable for impact cushioning, as the maximum permissible forces and spring excursions are already reached with relatively small axial impacts.

The cushioning element can be present in any form to take into account the mounting space and the forces occurring. According to a further preferred embodiment of the invention, the cushioning element encloses the rotor shaft. The cushioning element thereby advantageously has the form of a simple ring. The ring shape is particularly suitable, as is most appropriate for the geometrical parameters of the bearing. It also has the advantage over a number of individually disposed cushioning elements that no additional securing elements are required.

The cushioning element can have a symmetrical cross-section, in particular if it is configured as a ring shape. The cross-section can thereby be essentially round, rectangular or oval. Such cushioning elements can be produced particularly economically and still fulfill the required cushioning function. A cross-section that is elongated in the axial direction in particular brings about an elongation of the cushioning path or spring excursion, thereby achieving greater cushioning.

As an alternative to symmetrical cross-sections, the cushioning element can also have an asymmetrical cross-section. The use of a triangular form has proven particularly successful, with its effective prevention in particular of too significant a deformation of the cushioning element in the event of very significant loading.

It is also particularly advantageous, if the cushioning element has deformable equalizing elements on its lateral surface, in particular in the form of a number of peripheral studs. This help to equalize the radial tolerances. In other words they serve to increase the diameter tolerance range.

The upper and lower bearing surfaces of the cushioning element are preferably tailored to the form of the components resting thereon. A regular, smooth bearing surface is thereby expedient for a particularly even force absorption. To achieve greater degrees of deformation with small forces, the cushioning element is preferably configured such that at least one of the bearing surfaces has a number of grooves.

If both bearing surfaces have grooves and these are disposed such that the bases of the grooves are offset in respect of each other, high degrees of deformation can be achieved with small forces. The number of grooves, their size and position can thereby be varied depending on use. The resulting shaft form contributes to a smoother positioning of the bearing. In other words the claimed cushioning element can also be used to position the bearing.

If the cushioning element has opposing grooves, passage into the opposing groove is no longer possible, meaning that positioning is less smooth.

BRIEF DESCRIPTION OF THE DRAWINGS

The present invention is described below with reference to exemplary embodiments, which are described with the aid of drawings, in which.

DETAILED DESCRIPTION

Figure 1:
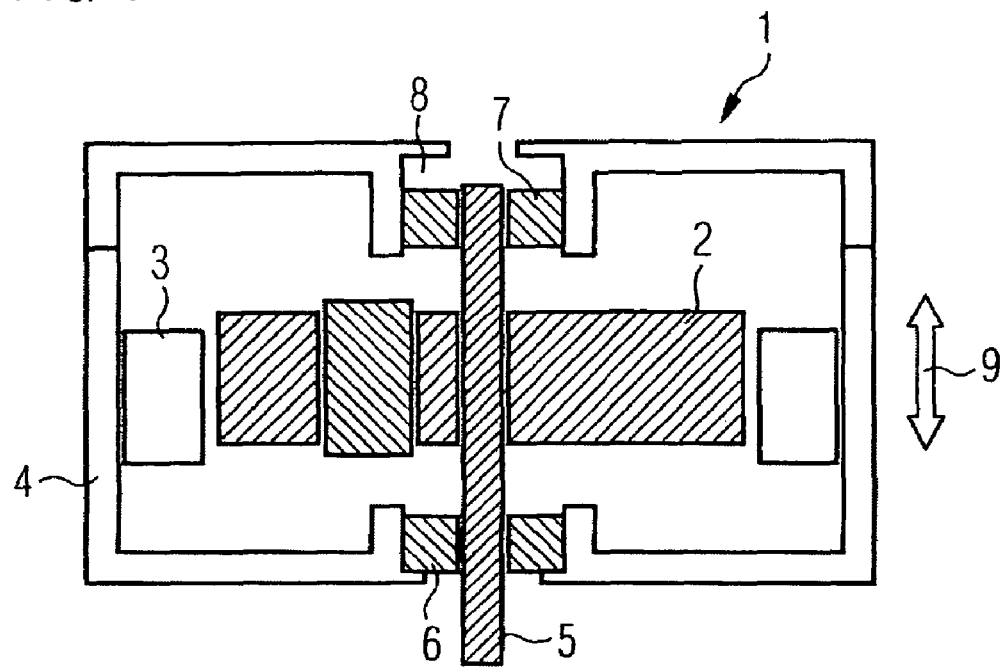
FIG. 1 shows a schematic diagram of an electric machine in the event of an impact to the shaft.

FIG. 1 shows a schematic diagram of a conventional electric motor 1 without the claimed cushioning element, as used as a drive for a radiator fan in a motor vehicle. The electric motor 1 has a rotor 2 and a stator 3, disposed in a housing 4. The rotor shaft 5 is positioned in a fixed bearing 6 on one side and in a floating bearing 7 on the other side, with the fixed bearing 7 being secured axially to prevent displacement. The bearings 6, 7 are configured as rolling bearings. The axial play 8 of the rotor 2 is thereby defined by the tolerance zone position and end float. In the event of an impact to the rotor shaft 5, the bearing 6 is loaded in the axial direction 9. This causes relative movement between the rotor 2 on the one side and the other components, in particular the stator 3 and the housing 4 on the other side.

Figure 2:
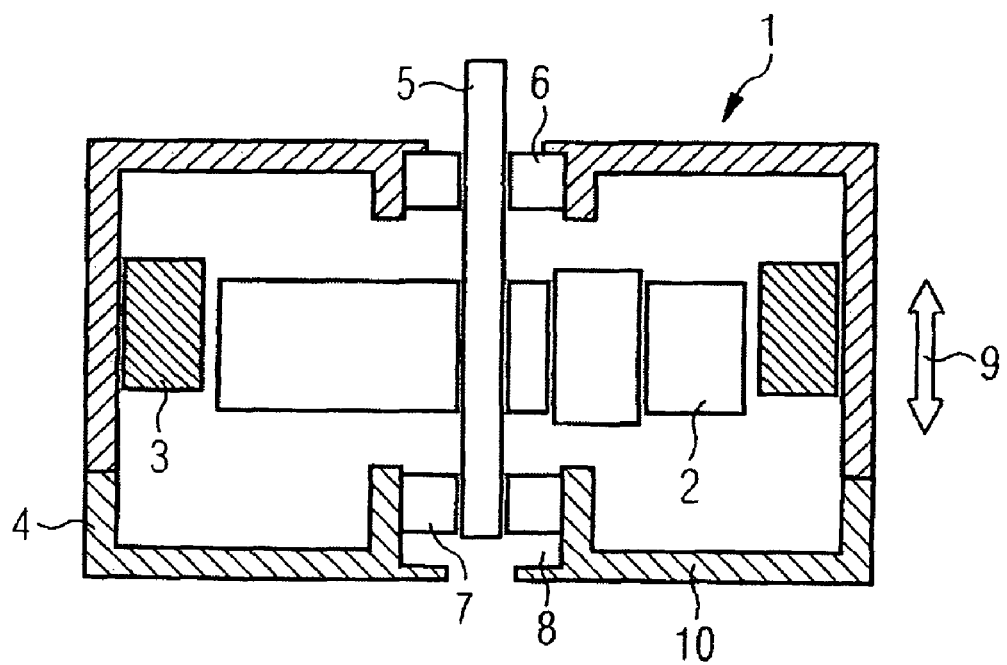
FIG. 2 shows a schematic diagram of an electric machine in the event of an impact to the rear.

FIG. 2 illustrates an impact to the rear 10 of the electric motor 1. This also causes relative movement between the main modules, with the rotor 2 being moved with the bearings 6, 7 in this instance.

Figure 3:
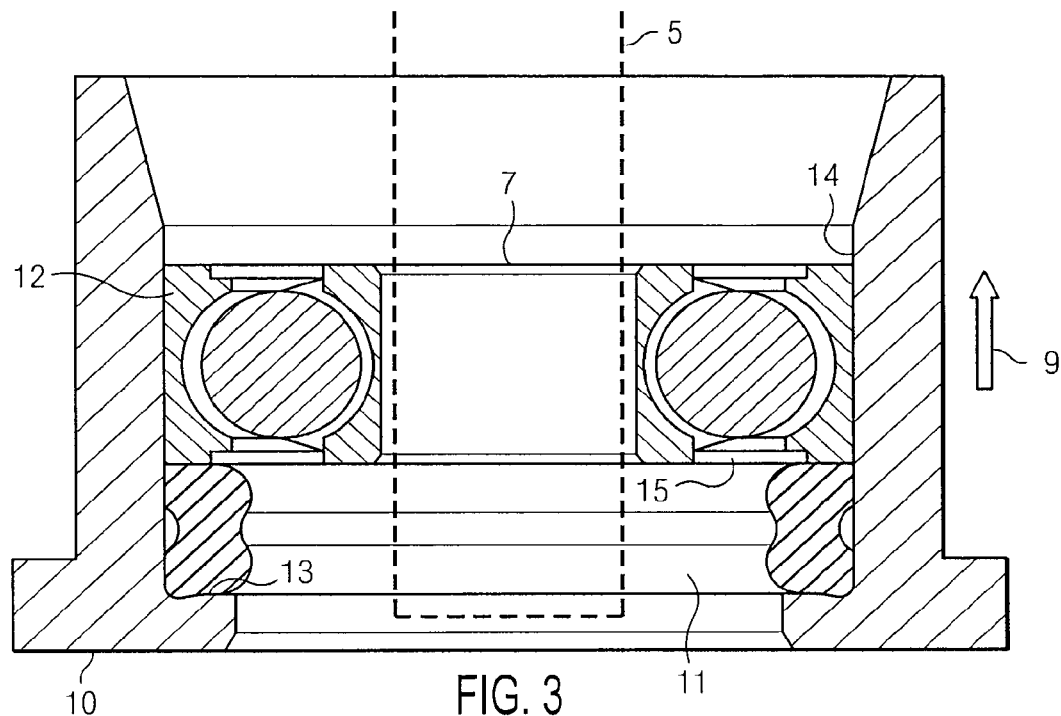
FIG. 3 shows a cross-section through a rolling bearing disposed in a bearing seat with a claimed cushioning element in the unloaded state.

To prevent axial loading peaks on the bearings 6, 7, a claimed cushioning element 11 is now attached to the floating bearing 7 of the electric motor 1, as shown in FIG. 3. This means that the fixed bearing 6 no longer has to be secured axially to prevent displacement. When the bearing system is loaded axially, it is possible in other words for the entire rotor 2 to be displaced axially without any damage being caused.

The cushioning element 11 is disposed between the outer ring 12 of the floating bearing 7 on the one side and an axial stop 13 of the bearing seat 14 provided for this purpose on the other side. In the embodiment shown here the mounting position of the cushioning element 11 corresponds approximately to the mounting position of an end float washer.

Figure 4:
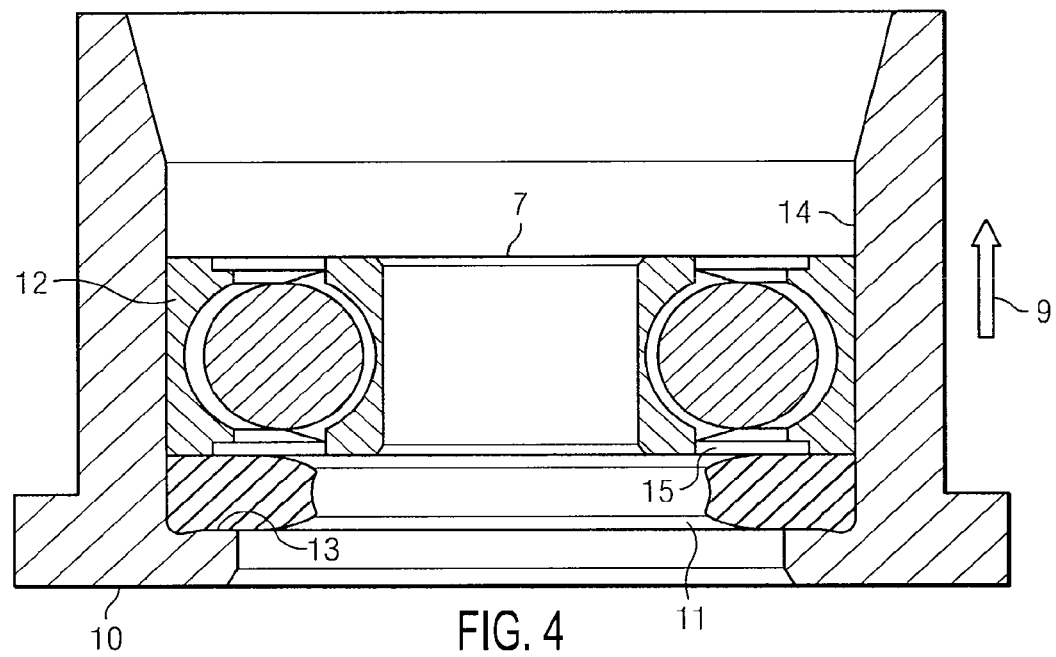
FIG. 4 shows a cross-section through a rolling bearing disposed in a bearing seat with a claimed cushioning element in the loaded state.

FIG. 3 shows the position of the cushioning element 11 in the unloaded state. When the floating bearing 7 is loaded in the axial direction 9, deformation of the cushioning element 11 results, see FIG. 4. The geometric conditions, in particular the radial demarcation of the mounting space by the bearing seat 14, cause pinching of the cushioning element 11 such that it is compressed in the axial direction 9 and as a result passes inward in the radial direction, i.e. perpendicular to the axial direction 9.

Depending on requirements and space conditions, it is possible to select the diameter and cord thickness of the cushioning element 11 freely. It should however be ensured that in the case of axial loading in particular the side plate 15 sealing the inside of the floating bearing 7 is not deformed by the cushioning element 11. FIGS. 5 to 8 show examples of different cushioning elements.

Figure 5:
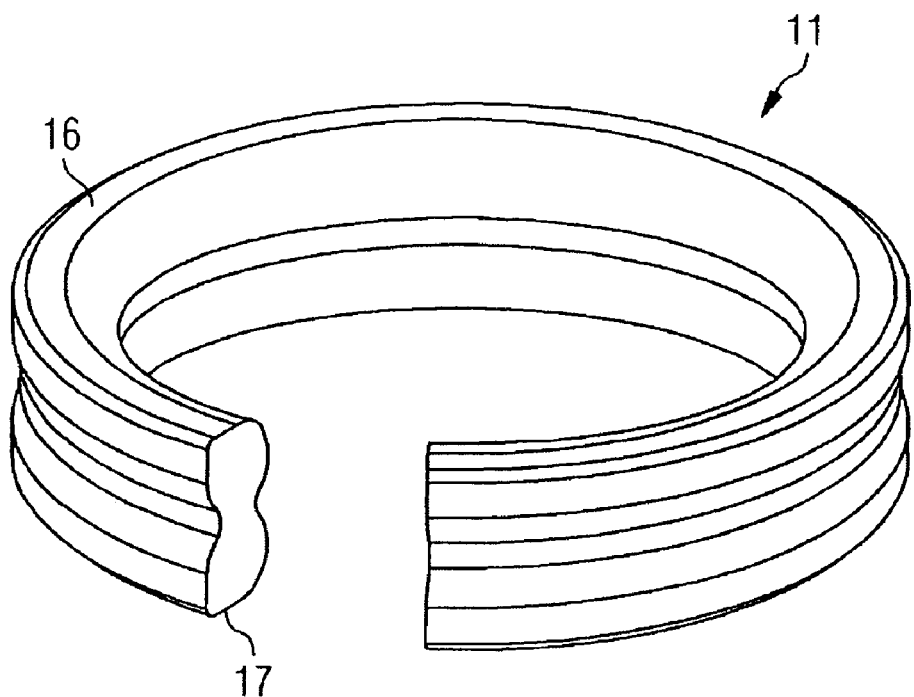
FIG. 5 shows a partial section of a first cushioning element.

The ring-shaped cushioning element 11 shown in FIG. 5 has a symmetrical cross-section, resulting from a combination of two O-rings disposed one on top of the other. A ring segment is cut out of the cushioning element for clarity. The upper bearing surface 16 and the lower bearing surface 17 of the cushioning element 11 are even and smooth, such that in the mounted state the cushioning element 11 rests fully on the outer ring 12 of the floating bearing 7 on the one side and on the axial stop 13 of the bearing seat 14 on the other side. The elongated cross-section means that a relatively long spring excursion and therefore a high level of cushioning are achieved.

Figure 6:
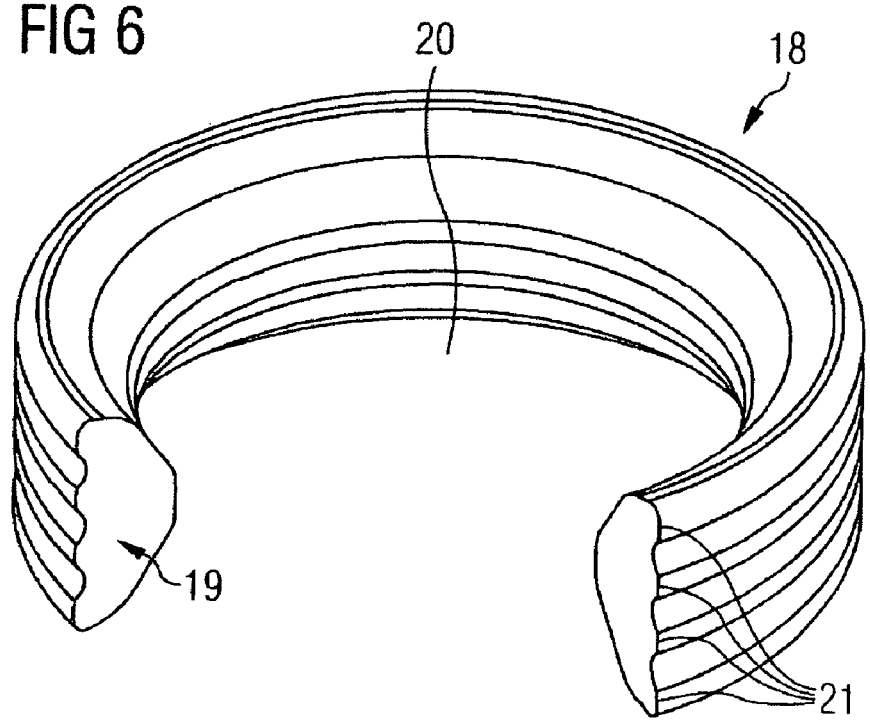
FIG. 6 shows a partial section of a second cushioning element.

The cushioning element 18 shown in FIG. 6 has a triangular cross-section 19, with the outer lateral surface of the cushioning element 18 being essentially flat, while the cross-section towards the center of the ring 20 is more or less pointed. A ring segment is again cut out of the cushioning element 18 for clarity. The triangular form of the cross-section effectively prevents buckling at the center of the cushioning element 18 at high levels of loading.

The cushioning element 18 shown in FIG. 6 has deformable equalizing elements in the form of peripheral studs 21 on the surface of an outer lateral surface 19. In the mounted state the studs 21 project towards the bearing seat 14, thereby reducing the radial bearing play.

Figure 7:
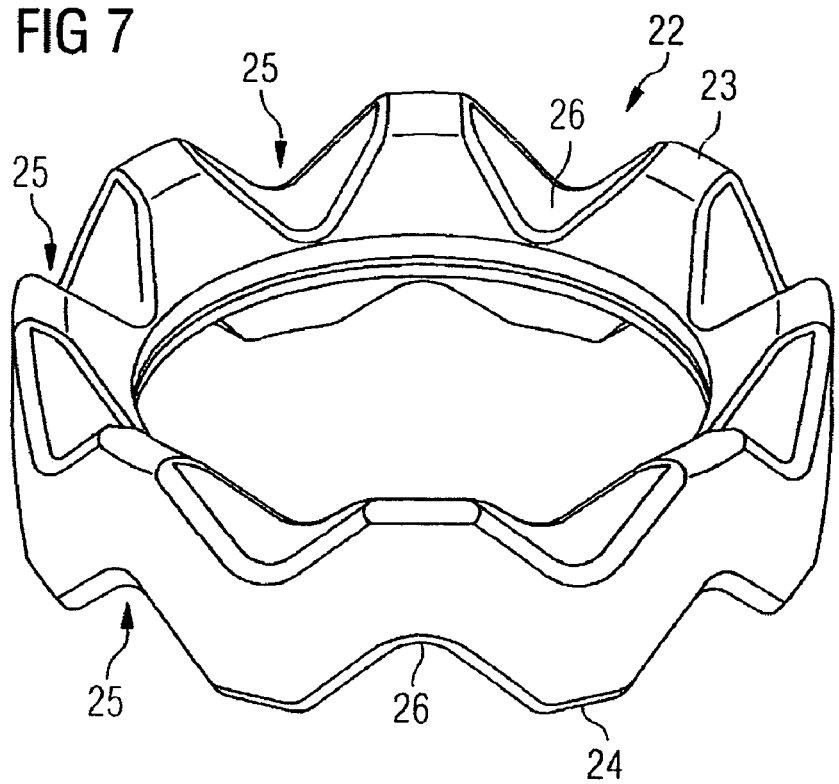
FIG. 7 shows a third cushioning element with offset grooves.

The cushioning element 22 shown in FIG. 7 has a number of grooves 25 on its upper and lower bearing surfaces 23, 24. The grooves 25 are thereby evenly distributed such that the groove bases 26 and the remainder of the bearing surfaces 23, 24 alternate. The grooves 25 on the upper bearing surface 23 are thereby offset in respect of the grooves 25 on the lower bearing surface 24, such that high degrees of deformation can be achieved with small forces.

Figure 8:
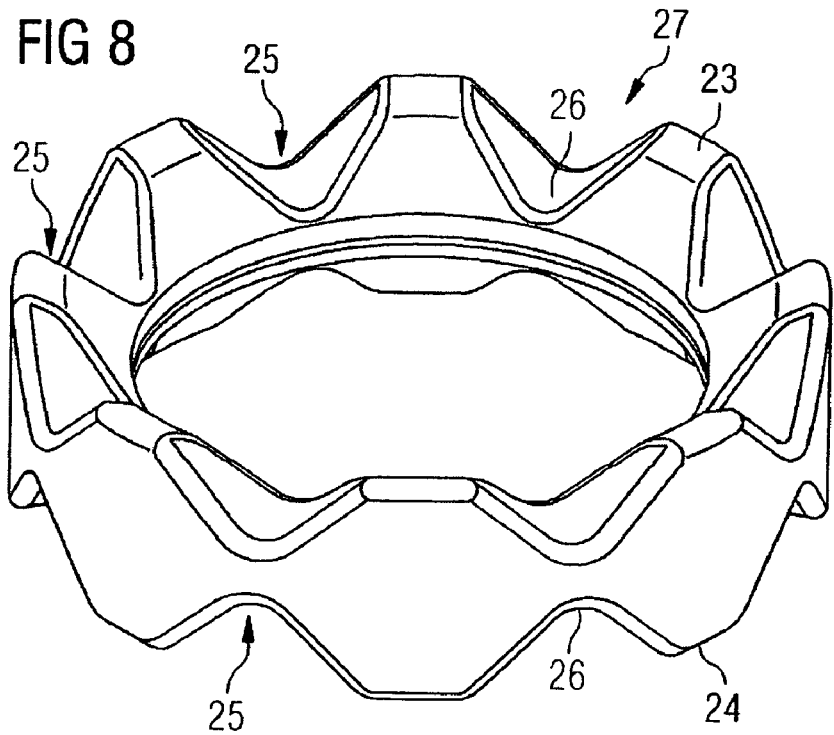
FIG. 8 shows a fourth cushioning element with opposing grooves.

The cushioning element 27 shown in FIG. 8 also has grooves 25 on both bearing surfaces 23, 24. However these lie opposite each other such that passage into the respective opposing groove is no longer possible.

What is claimed is:

1. An electric machine comprising:
   a rotor;
   a stator coupled to the rotor;
   a bearing system for the rotor; and
   a cushioning element arranged at a floating bearing of the bearing system and configured to reduce the axial play of the bearing system and to absorb axial loading of the bearing system,
   wherein the cushioning element has a first and second bearing surface, and at least one of the bearing surfaces of the cushioning element has a number of grooves, wherein both bearing surfaces of the cushioning element have grooves, with groove bases lying opposite each other, wherein the cushioning element has an essentially triangular cross-section, and wherein the triangular cross-section defines an outer lateral surface that is flat and interior surfaces that combine to form a point.

2. An electric machine according to claim 1, wherein the cushioning element is made of a plastic material.

3. An electric machine according to claim 1, wherein the cushioning element encloses a rotor shaft.

4. An electric machine according to claim 1, wherein the cushioning element has a ring shape.

* * * * *